United States Patent
Diehl

(10) Patent No.: US 11,263,606 B2
(45) Date of Patent: *Mar. 1, 2022

(54) CONSUMER DUE DILIGENCE FOR MONEY TRANSFER SYSTEMS AND METHODS

(71) Applicant: The Western Union Company, Denver, CO (US)

(72) Inventor: Kristine Diehl, Parker, CO (US)

(73) Assignee: The Western Union Company, Denver, CO (US)

( * ) Notice: Subject to any disclaimer, the term of this patent is extended or adjusted under 35 U.S.C. 154(b) by 138 days.

This patent is subject to a terminal disclaimer.

(21) Appl. No.: 16/661,530

(22) Filed: Oct. 23, 2019

(65) Prior Publication Data

US 2020/0058003 A1 Feb. 20, 2020

Related U.S. Application Data

(63) Continuation of application No. 15/686,505, filed on Aug. 25, 2017, now Pat. No. 10,482,435, which is a
(Continued)

(51) Int. Cl.
*G06Q 20/10* (2012.01)
*G06Q 20/02* (2012.01)
(Continued)

(52) U.S. Cl.
CPC ............. *G06Q 20/10* (2013.01); *G06Q 20/02* (2013.01); *G06Q 20/20* (2013.01); *G06Q 20/202* (2013.01);
(Continued)

(58) Field of Classification Search
CPC ........ G06Q 20/10; G06Q 20/02; G06Q 20/20; G06Q 20/202; G06Q 20/204;
(Continued)

(56) References Cited

U.S. PATENT DOCUMENTS

| 5,557,518 A | 9/1996 | Rosen |
| 5,675,662 A | 10/1997 | Deaton et al. |

(Continued)

OTHER PUBLICATIONS

PCT/US2010/027669 , "International Preliminary Report on Patentability", dated Oct. 6, 2011, 9 pages.
(Continued)

*Primary Examiner* — Russell S Glass
(74) *Attorney, Agent, or Firm* — Kilpatrick Townsend & Stockton, LLP

(57) ABSTRACT

A method of transferring money from a sender to a recipient using a third party money transfer service a point of sale device receiving transaction details for a requested money transfer; determining whether the requested transaction is an allowable transaction; and either aborting the transaction; attempting to identify the sender as an existing customer using the transaction details; using the sender's transaction history and the transaction details to determine whether to allow the requested transaction to proceed. If the requested transaction is allowed to proceed, the method includes creating a money transfer record for the requested transaction; associating a money transfer control number to the money transfer record; and using the transaction details to determine whether to monitor the requested transaction.

20 Claims, 6 Drawing Sheets

Related U.S. Application Data continuation of application No. 13/894,437, filed on May 15, 2013, now Pat. No. 9,747,587, which is a continuation of application No. 12/409,937, filed on Mar. 24, 2009, now Pat. No. 8,473,352.

(51) Int. Cl.
*G06Q 20/20* (2012.01)
*G06Q 20/40* (2012.01)
*G06Q 40/02* (2012.01)

(52) U.S. Cl.
CPC ......... *G06Q 20/204* (2013.01); *G06Q 20/206* (2013.01); *G06Q 20/40* (2013.01); *G06Q 20/405* (2013.01); *G06Q 20/4037* (2013.01); *G06Q 40/02* (2013.01)

(58) Field of Classification Search
CPC .. G06Q 20/206; G06Q 20/40; G06Q 20/4037; G06Q 20/405; G06Q 40/02
USPC ............................................................ 705/21
See application file for complete search history.

(56) References Cited

U.S. PATENT DOCUMENTS

| | | | |
|---|---|---|---|
| 6,827,260 | B2 | 12/2004 | Stoutenburg et al. |
| 6,941,274 | B1 | 9/2005 | Ramachandran et al. |
| 7,003,493 | B2 | 2/2006 | Weichert et al. |
| 7,213,744 | B2 | 5/2007 | Michelsen et al. |
| 7,349,566 | B2 | 3/2008 | Jones et al. |
| 8,473,352 | B2 * | 6/2013 | Diehl ................... G06Q 20/02 705/17 |
| 8,533,851 | B2 * | 9/2013 | Ginter ................... H04L 63/104 726/27 |
| 9,747,587 | B2 | 8/2017 | Diehl |
| 10,482,435 | B2 | 11/2019 | Diehl |
| 2001/0001877 | A1 | 5/2001 | French et al. |
| 2002/0010684 | A1 | 1/2002 | Moskowitz |
| 2002/0056043 | A1 | 5/2002 | Glass |
| 2002/0166891 | A1 | 11/2002 | Stoutenburg et al. |
| 2003/0063772 | A1 | 4/2003 | Smith et al. |
| 2003/0149662 | A1 | 8/2003 | Shore |
| 2003/0167237 | A1 | 9/2003 | Degen et al. |
| 2004/0024700 | A1 | 2/2004 | Petigny |
| 2004/0205023 | A1 | 10/2004 | Hafer et al. |
| 2004/0215558 | A1 | 10/2004 | Morales et al. |
| 2004/0260649 | A1 | 12/2004 | Kagehiro et al. |
| 2005/0079474 | A1 | 4/2005 | Lowe |
| 2005/0160052 | A1 | 7/2005 | Schneider et al. |
| 2005/0238208 | A1 | 10/2005 | Sim |
| 2005/0256539 | A1 | 11/2005 | George et al. |
| 2005/0289582 | A1 | 12/2005 | Tavares et al. |
| 2006/0006224 | A1 | 1/2006 | Modi |
| 2006/0160525 | A1 | 7/2006 | Watanabe |
| 2007/0084911 | A1 | 4/2007 | Crowell |
| 2007/0112710 | A1 | 5/2007 | Drane et al. |
| 2007/0113099 | A1 | 5/2007 | Takikawa et al. |
| 2007/0175998 | A1 | 8/2007 | Lev |
| 2007/0187494 | A1 | 8/2007 | Hanna |
| 2007/0198432 | A1 | 8/2007 | Pitroda et al. |
| 2007/0208662 | A1 | 9/2007 | Jeronimus et al. |
| 2008/0065468 | A1 | 3/2008 | Berg et al. |
| 2008/0243690 | A1 | 10/2008 | Paintin et al. |
| 2008/0253621 | A1 | 10/2008 | Connell et al. |
| 2008/0290154 | A1 | 11/2008 | Barnhardt et al. |
| 2009/0099983 | A1 | 4/2009 | Drane et al. |
| 2009/0147990 | A1 | 6/2009 | Lev |
| 2009/0266880 | A1 | 10/2009 | Gustin et al. |
| 2010/0113863 | A1 | 5/2010 | George et al. |
| 2010/0250375 | A1 | 9/2010 | Diehl |
| 2011/0184247 | A1 | 7/2011 | Contant et al. |
| 2012/0047525 | A1 | 2/2012 | Campagna et al. |
| 2013/0254054 | A1 | 9/2013 | Diehl |
| 2018/0046996 | A1 | 2/2018 | Diehl |

OTHER PUBLICATIONS

PCT/US2010/027669 , "International Search Report and Written Opinion", dated May 17, 2010, 9 pages.

PCT/US2010/039243 , "International Preliminary Report on Patentability", dated Jan. 12, 2012, 10 pages.

PCT/US2010/039243 , "International Search Report and Written Opinion", dated Aug. 20, 2010, 11 pages.

* cited by examiner

CONSUMER DUE DILIGENCE FOR MONEY TRANSFER SYSTEMS AND METHODS

This application is a continuation of U.S. patent application Ser. No. 15/686,505, filed Aug. 25, 2017, and entitled "CONSUMER DUE DILIGENCE FOR MONEY TRANSFER SYSTEMS AND METHODS," which is a continuation of U.S. patent application Ser. No. 13/894,437, filed on May 15, 2013, issued as U.S. Pat. No. 9,747,587, and entitled "CONSUMER DUE DILIGENCE FOR MONEY TRANSFER SYSTEMS AND METHODS", which is a continuation of U.S. patent application Ser. No. 12/409,937, filed on Mar. 24, 2009, issued as U.S. Pat. No. 8,473,352, and entitled "CONSUMER DUE DILIGENCE FOR MONEY TRANSFER SYSTEMS AND METHODS." The entire disclosures of the above applications are hereby incorporated by reference, for all purposes, as if fully set forth herein.

FIELD OF THE INVENTION

Embodiments of the present invention relate generally to money transfer systems and methods. More specifically, embodiments of the invention relate to systems and methods for analyzing data associated with money transfers.

BACKGROUND OF THE INVENTION

Third party money transfer services are used extensively to move funds, typically between individuals or between an individual and a business. While in the past such services required the sender to deposit cash or cash-equivalent funds in person with a representative of a third party money transfer service provider, such is no longer the case. Individuals are now able to initiate money transfers from any of a number of platforms (e.g., the Internet, unmanned kiosks, automated teller machines, mobile devices, etc.) using a variety of funds sources (pre-paid accounts, virtual wallets, stored value cards, etc.) and transferring to various destinations (recipient accounts, virtual wallets, ATMs, etc.). Accordingly, this level of convenience has increased the popularity of money transfers using third party services such as that provided by Western Union of Englewood, Colo.

With the increased popularity of money transfer services has come increased scrutiny. Greater regulatory attention has been focused on money transfer services, and providers of such services are obligated to comply. Two examples of compliance requirements sources include Anti-Money Laundering and Anti-Terrorist Financing. As a result, money transfer service providers are engaged in an ongoing struggle to increase the convenience of money transfer services while complying with a growing body of compliance requirements.

BRIEF SUMMARY OF THE INVENTION

Embodiments of the present invention provide a method of transferring money from a sender to a recipient using a third party money transfer service. The method includes providing a point of sale device at a money transfer origination location in communication with a host computer system of a money transfer network; entering into the point of sale device transaction details for a requested money transfer by the sender, wherein the details include at least a sender name, a recipient name, and a transfer amount; determining with the point of sale device whether the requested transaction is an allowable transaction; if the transaction is determined not to be an allowable transaction, aborting the transaction; if the transaction is determined to be an allowable transaction, attempting to identify the sender as an existing customer of the third party money transfer service using the transaction details. Existing customers have a unique customer identifier and transaction history. If the attempt to identify the sender as an existing customer of the third party money transfer service using the transaction details is unsuccessful, the method includes displaying a prompt on the point of sale device that additional information is required; entering the additional information into the point of sale device; and attempting to identify the sender as an existing customer of the third party money transfer service using the transaction details and the additional information. If the sender cannot be identified as an existing customer of the third party money transfer service using the transaction details or the transaction details and the additional information, the method further includes assigning a unique customer identifier to the sender; allowing the transaction to proceed; and storing at least a portion of the transaction details and at least a portion of the additional information as transaction history in a record with the sender's unique customer identifier. If the sender can be identified as an existing customer of the third party money transfer service using the transaction details or the transaction details and the additional information, the method includes recalling the sender's transaction history; and using the sender's transaction history and the transaction details to determine whether to allow the requested transaction to proceed. If the requested transaction is allowed to proceed, the method includes creating a money transfer record for the requested transaction; associating a money transfer control number to the money transfer record; and using the transaction details to determine whether to monitor the requested transaction.

In some embodiments, the method includes providing a second point of sale device at a money transfer reception location in communication with the host computer system of the money transfer network, entering the money transfer control number into the point of sale device to thereby locate the money transfer record; and determining, based on the transaction details whether to collect personal information from the recipient. Using the sender's transaction history and the transaction details to determine whether to allow the requested transaction to proceed may include using the money transfer origination location or the money transfer reception location, at least in part, to determine whether to allow the requested transaction to proceed. Using the sender's transaction history and the transaction details to determine whether to allow the requested transaction to proceed may include determining whether a transaction frequency exceeds a predetermined frequency threshold. Using the sender's transaction history and the transaction details to determine whether to allow the requested transaction to proceed may include aggregating a plurality of transaction amounts by the sender and determining whether the aggregate exceeds a predetermined aggregation threshold. Using the sender's transaction history and the transaction details to determine whether to allow the requested transaction to proceed may include determining whether a transaction pattern comprises an unallowable transaction pattern. Attempting to identify the sender as an existing customer of the third party money transfer service using the transaction details may include using the host computer system to attempt to identify the sender as an existing customer of the third party money transfer service using the transaction details. Using the sender's transaction history and the transaction details to determine whether to allow the requested transaction to proceed may include using the host computer system to determine whether to allow the requested transaction to proceed.

Other embodiments provide a money transfer system. The system includes a host computer system and a plurality of point of sale devices at money transfer origination locations in communication with the host computer system. Each point of sale device is configured to receive transaction details for a requested money transfer by a sender to a recipient. The details include at least a sender name, a recipient name, and a transfer amount. Each point of sale device is further configured to determine whether the requested transaction is an allowable transaction; abort the transaction if the transaction is determined not to be an allowable transaction; and transfer the transaction details to the host computer system. The host computer system is also configured to: attempt to identify the sender as an existing customer using the transaction details, wherein existing customers have a previously-assigned unique customer identifier and transaction history stored in a record accessible to the host computer system; send a message to the point of sale device that additional information is required if the attempt to identify the sender as an existing customer is unsuccessful; receive the additional information; attempt to identify the sender as an existing customer using the transaction details and the additional information; recall the sender's transaction history if the sender can be identified as an existing customer; use the sender's transaction history and the transaction details to determine whether to allow the requested transaction to proceed; store at least a portion of the transaction details and the additional information in a record with the sender's unique customer identifier; create a money transfer record for the requested transaction; associate a money transfer control number to the money transfer record; and use at least a portion of the transaction details to determine whether to monitor the requested transaction.

In some embodiments, at least one of the plurality of point of sale devices is configured to receive the money transfer control number and interact with the host computer system to determine, based on the transaction details, whether to collect personal information from the recipient. In being configured to use the sender's transaction history and the transaction details to determine whether to allow the requested transaction to proceed, the host computer system may be configured to use a money transfer origination location or a money transfer reception location, at least in part, to determine whether to allow the requested transaction to proceed. In being configured to use the sender's transaction history and the transaction details to determine whether to allow the requested transaction to proceed, the host computer system may be configured to determine whether a transaction frequency exceeds a predetermined frequency threshold. In being configured to use the sender's transaction history and the transaction details to determine whether to allow the requested transaction to proceed, the host computer system may be configured to aggregate a plurality of transaction amounts by the sender and determine whether an associated aggregate exceeds a predetermined aggregation threshold. In being configured to use the sender's transaction history and the transaction details to determine whether to allow the requested transaction to proceed, the host computer system may be configured to determine whether a transaction pattern comprises an unallowable transaction pattern.

Still other embodiments provide a computerized method of processing money transfer transactions. The method includes establishing a plurality of processing rules; storing the processing rules such that the rules are accessible to each of a plurality of money transfer point of sale devices located at money transfer origination locations; at a money transfer origination location and in response to a request by a sender customer to initiate a money transfer transaction, receiving a first set of data into one of the plurality of money transfer point of sale devices. The first set of data includes at least a sender name, a recipient name, and a transfer amount. The method also includes applying one or more of the plurality of rules to the first set of data to determine whether the requested transaction is an allowable transaction. If the transaction is determined not to be an allowable transaction, the method includes aborting the transaction. If the transaction is determined to be an allowable transaction, the method includes applying one or more of the plurality of rules to the first set of data to attempt to identify the sender as a previous customer having a previously-assigned unique customer identifier and associated transaction history. If the attempt to identify the sender as a previous customer is unsuccessful, the method includes: displaying a prompt on the point of sale device that additional data is required; receiving the additional data into the point of sale device; and applying one or more of the plurality of rules to the additional data to attempt to identify the sender as a previous customer. If the sender cannot be identified as a previous customer, the method includes: assigning a unique customer identifier to the sender; allowing the transaction to proceed; and storing at least a portion of the first set of data and the additional data as transaction history in a record with the sender's unique customer identifier. If the sender can be identified as a previous customer, the method includes: recalling the sender's transaction history; and using the sender's transaction history and at least a portion of the first set of data and the additional data to determine whether to allow the money transfer transaction to proceed. If the money transfer transaction is allowed to proceed, the method includes creating a money transfer record for the money transfer transaction; associating a money transfer control number to the money transfer record; and using at least a portion of the sender's transaction history, the first set of data, and the additional data to determine whether to monitor the money transfer transaction.

In some embodiments the method includes receiving the money transfer control number into one of the plurality of money transfer point of sale devices; and determining whether to collect personal information from a recipient. One or more of the processing rules may use a money transfer origination location or a money transfer reception location, at least in part, to determine whether to allow the requested transaction to proceed. One or more of the processing rules may use the sender's transaction history and the transaction details to determine whether a transaction frequency exceeds a predetermined frequency threshold. One or more of the processing rules may use the sender's transaction history and the transaction details to aggregate a plurality of transaction amounts by the sender and determine whether an associated aggregate exceeds a predetermined aggregation threshold. One or more of the processing rules may use the sender's transaction history and the transaction details to determine whether a transaction pattern comprises an unallowable transaction pattern.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
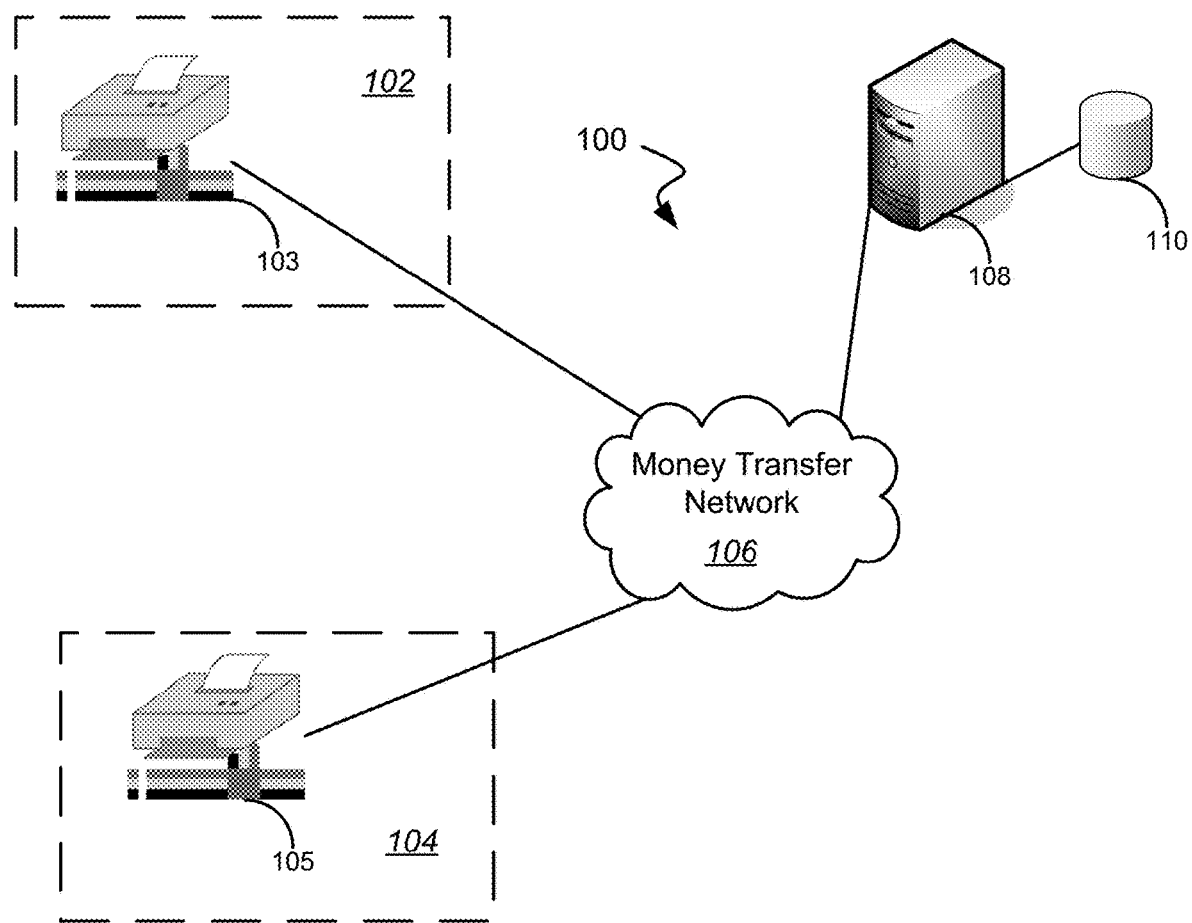
FIG. 1 depicts an exemplary money transfer system according to embodiments of the present invention.

Embodiments of the present invention provide systems and methods for enhancing due diligence efforts regarding money transfer services. In particular, embodiments of the present invention provide real-time analysis of money transfer transactions. In this context, "real-time" means that a particular transaction is evaluated for due diligence purposes as a transaction record is created, typically before the funds associated with the transaction are collected from the initiator.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form or omitted from the description.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a non-transitory machine readable medium. A processor(s) may perform the necessary tasks.

Embodiments of the present invention relate to real-time analysis of data associated with financial transactions. In order to provide a context for describing embodiments of the present invention, embodiments of the invention will be described herein with reference to in-person money transfers using the services of a third party money transfer service provider, transactions known commonly as "wire transfers." Those skilled in the art will appreciate, however, that other embodiments are possible.

According to embodiments of the invention, an individual desiring to transfer funds to another individual or to a business visits a money transfer origination location. In the specific embodiment described herein, the location is manned by a representative of the third party money transfer service provider, such as a Western Union agent location, but in other embodiments, the origination location may be a web site, a kiosk, an ATM, or any of a variety of other locations from which money transfers may be originated. Suitable money transfer origination locations are located worldwide.

The individual originating the money transfer (hereinafter "sender") begins the process by completing a form or otherwise providing certain information to an attendant. Different information may be required, depending, for example, on the size of the money transfer, the geographic location of the money transfer origination location, and/or the like. Necessary information may include, for example, the name, address, and phone number of the sender, the name, address, and phone number of the recipient, and the like. In some embodiments, the sender and/or the recipient may have a previously-assigned customer identification number, which may be used to recall sender's and/or recipient's personal information.

As the attendant enters the information, a transaction record is built. In some embodiments, the record is built locally on a point-of-sale device or other hardware located at the origination location. In other embodiments, the transaction record is built on a host computer system as transaction details are periodically sent via network from hardware at the origination location to the host computer system. In either case, compliance rules are applied to the transaction details as the transaction record is built.

As the rules are applied to the data, the attendant may be instructed to take certain actions. For example, the attendant may be instructed to collect certain additional data from the sender. The attendant may be instructed to confirm the sender's identity by requesting a specific form of identification or a biometric sample (e.g., fingerprint, voice sample, eye scan, etc.). The additional data may be added to the transaction record being built.

In certain embodiments, the rules are aimed at positively identifying the sender as a pre-existing customer or a new customer. If the sender is identified as a preexisting customer, rules operate to assess the current transaction in the context of the sender's transaction history. In specific embodiments, rules focus on the size, frequency, pattern, destination, recipient, and/or the like of the sender's transaction history to thereby determine whether any compliance regulations would be violated by allowing the transaction to proceed.

If the sender is positively identified as a preexisting customer and the desired transaction would not violate a compliance regulation, then the transaction is allowed to proceed. The details of the transaction are added to the customer's transaction history. Otherwise, the pending transaction is blocked.

In some cases, a decision is made to allow the transaction to proceed but to monitor the transaction. This may include due diligence with respect to the recipient of the funds sent by the sender. When the funds are requested, an attempt may be made to positively identify the recipient as a preexisting customer. If successful, the pending money transfer is evaluated in the context of the recipient's transaction history. Various compliance measures may be required depending on whether the attempt to identify the recipient as an existing customer is successfully, up to and including aborting the transaction and returning the funds to the sender.

If customers cannot be positively identified as preexisting customers, a unique identifier is created and coupled to the customer with the intent that all future transactions involving the customer—without regard to whether the customer is the sender or the recipient and without regard to where, geographically, the transactions originate or terminate—be associated to the number. For convenience, the unique identifier will be referred to herein as a "galactic ID." The galactic ID is not provided to the customer, although it could be, but the customer may desire to voluntarily participate in, for example, a loyalty program, in which case a loyalty program identifier positively links the customer to the galactic ID. Other data supplied by the customer or developed through dealings with the customer also are associated with the galactic ID.

Without regard to how transactions are ultimately disposed (abort, allow, allow and monitor), transaction details for the transaction are added to the transaction history of the sender and recipient. The growing transaction history database is thereafter used for compliance purposes regarding future transactions.

It will be appreciated in light of this detailed description that various functions according to embodiments of the present invention may be performed at different locations within the system. For example, a significant portion of the enhanced consumer due diligence process may be performed at the "front end," where a transaction is originated, or at the "back end" where transactions are aggregated by a central, or host, computer system. Further, the various functions may be implemented in any of a variety of ways, including rules-based, as described herein. Rules may be multi-level, depending, for example, on the originating agent, geographic location of the origination location, recipient's geographic location, the amount of the transaction, the sender's or the recipient's transaction history, and the like. Moreover, the rules may be applied with dynamic effect, altering the transaction process flow in myriad ways depending on various specific transaction details.

Having described embodiments of the present invention generally, attention is directed to FIG. 1, which depicts a money transfer system 100 according to a specific embodiments of the present invention. The system 100 includes a money transfer origination location 102, having a point of sale device 103, and a money transfer reception location 104, having a point of sale device 105. Both the money transfer origination location 102 and the money transfer reception location 104 are connected via a money transfer network 106 to a host computer system 108. The host computer system 108 has an associated database 110, which stores records relating to customers of the money transfer service provided by the system 100 and also maintains records of transactions processed using the money transfer system 100.

Those skilled in the art will recognize the system 100 as a high level depiction of a money transfer system, such as that operated by Western Union. Such a system may include thousands of money transfer locations, which may serve as origination locations or reception locations. Money transfer locations may be located worldwide. The point of sale devices at money transfer locations may be any device capable of receiving transaction details and communicating those details to the host computer system. Moreover, the host computer system 108 may be a collection of computers spread throughout the money transfer network 106.

It should be appreciated that suitable money transfer locations may include kiosks, automated teller machines, personal computers operating appropriate software for interfacing to the money transfer network, and/or the like. In some embodiments, mobile devices may be used to both originate and receive money transfers. Many other embodiments are possible and apparent to those skilled in the art in light of this detailed description.

Figure 2:
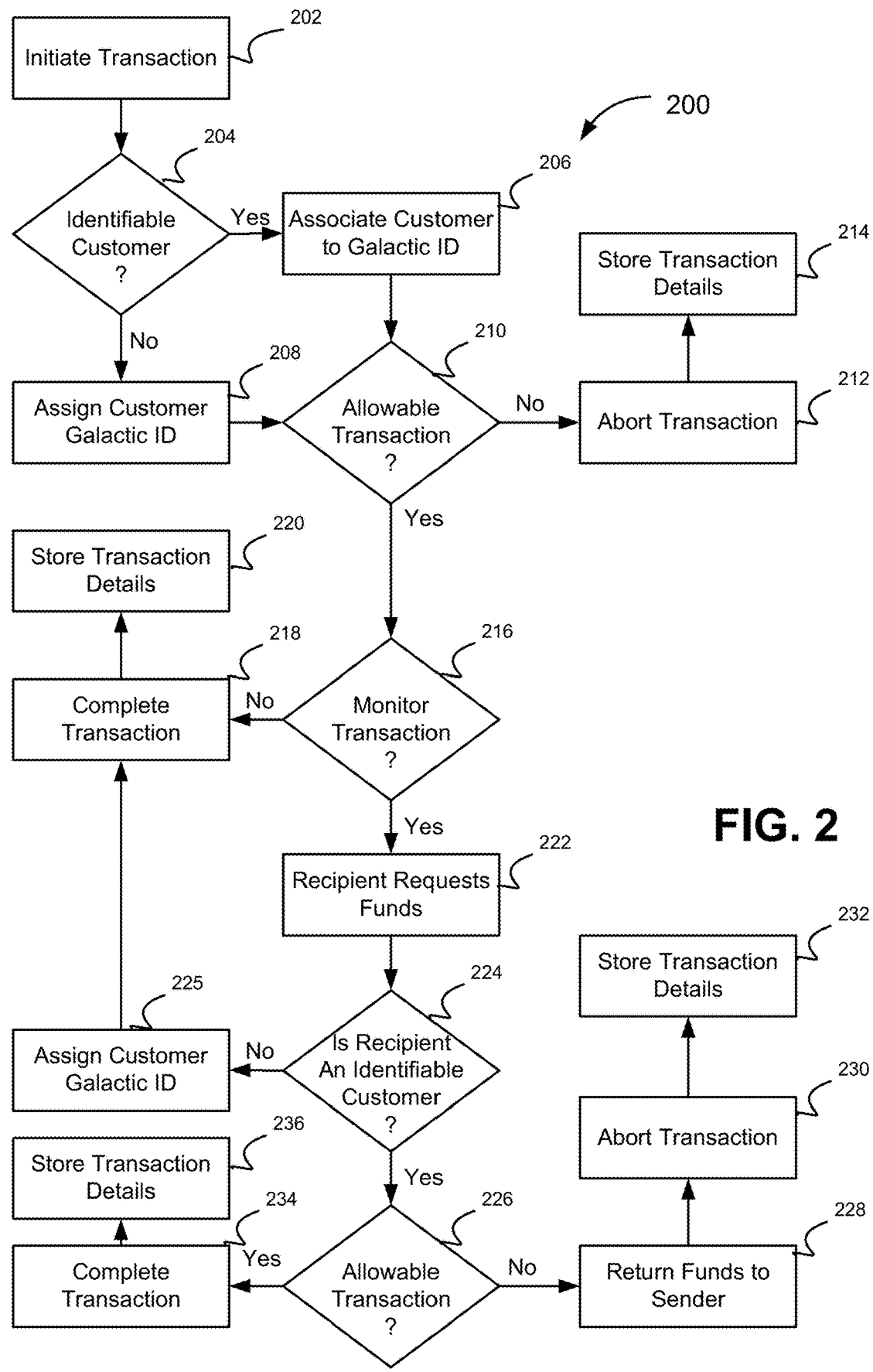
FIG. 2 depicts an exemplary consumer due diligence method according to embodiments of the invention, which method may be implemented in the system of FIG. 1.

FIG. 2 depicts an exemplary method 200 of enhanced, real-time consumer due diligence in money transfer transactions, which method may be implemented in the system of FIG. 1. Those skilled in the art will appreciate that the method 200 is merely exemplary of a number of possible embodiments according to the present invention, and that other methods according to other embodiments may include more, fewer, or different steps than those illustrated and described here. Also, the various blocks may be traversed in orders different than described herein.

The method 200 begins at block 202 at which a money transfer transaction is initiated by a sender at an origination location. This includes the collection of various details, such as the amount of the transfer, the sender's name and the recipient's name. Rules may be operable to require the collection of additional details depending on, for example, the amount of money being transferred, the destination of the funds, and the like.

At block 204 an attempt is made to identify the sender as a preexisting customer. If successful, the customer may be associated to an existing galactic ID at block 206. If the customer cannot be identified as an existing customer, additional information my be collected and a subsequent attempt to identify the customer as an existing customer may occur. If the customer cannot be identified as an existing customer, then the customer may be assigned to a galactic ID at block 208. Block 204, 206, and 208 may be carried out at the origination location, at the host computer, or by the two collaborating.

Attempting to identify the sender as an existing customer may include using any of the information provided by the customer to locate corresponding information in a customer database. Various algorithms, rules, or processes may be used to identify the customer, and various levels of confidence may be employed to determine that a match has been made. In some embodiments, biometrics or images of the customer are used. These may be gathered actively or passively. For example, facial recognition may be used to compare a passively-gathered image of the customer to images of the customer gathered from the customer previously.

At block 210, a determination is made whether the pending transaction is allowable. The decision may be based on the specifics of the pending transaction or on an aggregation of the pending transaction and the customer's transaction history. If the transaction is unallowable for any reason, the transaction is aborted, as represented by block 212. Nevertheless, the details of the transaction, including an indication that the transaction was aborted, are stored in a transaction database, represented by block 214.

If the transaction is allowed, a decision may be made at block 216 whether to monitor the transaction. If, for example, the customer can be identified and the transaction is not otherwise unallowable, a decision may nevertheless be made to monitor the transaction to completion. One exemplary reason being that the pending transaction departs from a long-established pattern of transactions for the customer, thereby raising a flag. Many other examples are possible. If no need to monitor the transaction exists, then the transaction is completed at block 218 when the recipient picks up the funds, and the details of the transaction are stored, represented by block 220.

If, however, a decision is made to monitor the transaction, the process continues at block 222 when the recipient requests the funds at a reception location. In a manner similar to that used to identify the sender, an attempt is made at block 224 to identify the recipient as an existing customer. If the recipient is not identifiable as an existing customer, then the transaction proceeds to block 225, at which the recipient is assigned a galactic ID, and the process continues to completion at blocks 218 and 220.

If the recipient is identifiable as an existing customer, then a determination is made at block 226 whether the transaction should be completed. This may be accomplished using rules and may be based on the recipient's transaction history. If the result of the decision is to not allow the transaction to proceed, then the funds are returned to the sender at block 228, the transaction is aborted at block 230, and the transaction details are stored at block 232. Otherwise, the transaction proceeds at block 234. The transaction is completed and the details are stored at block 236.

Figure 3:
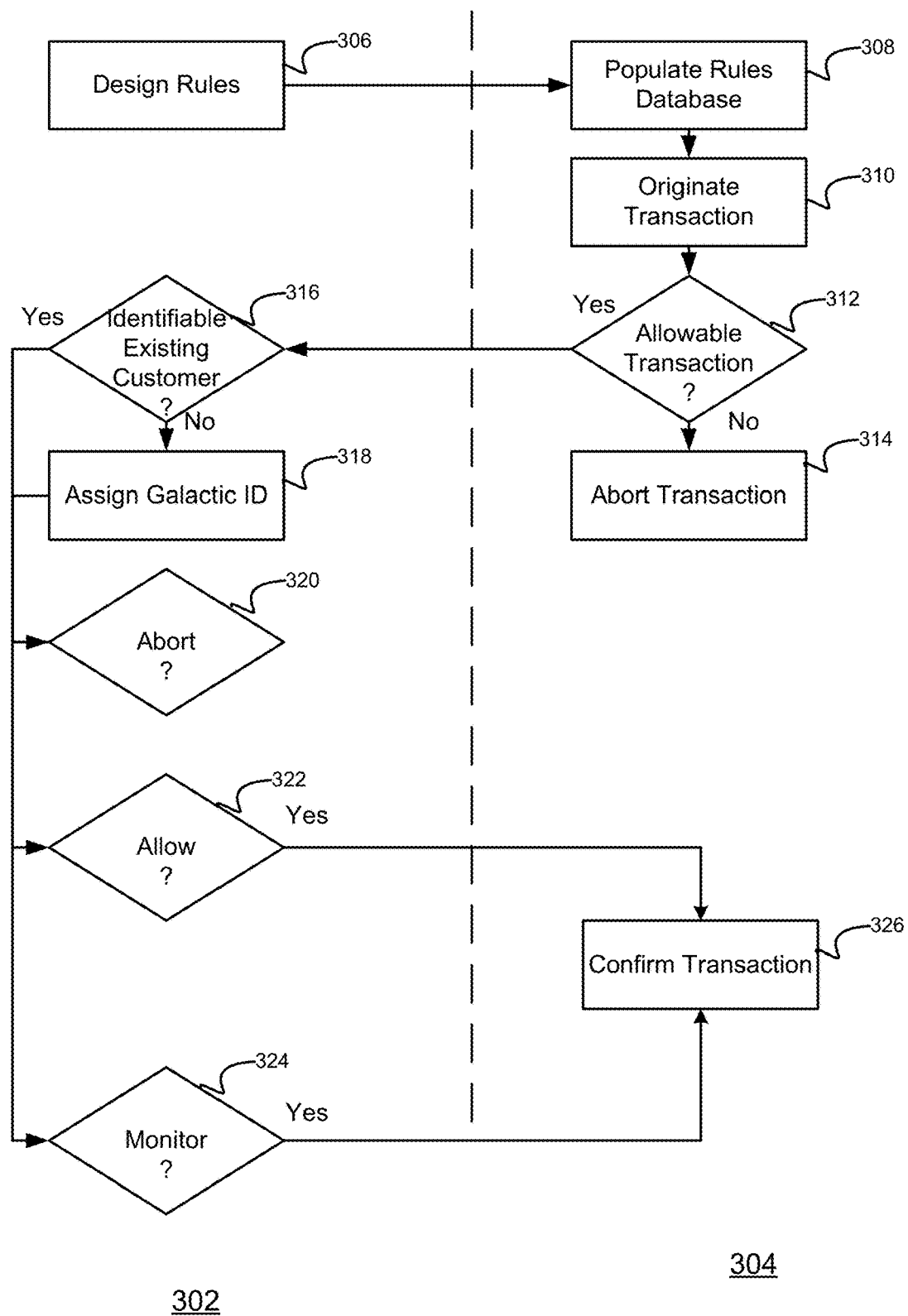
FIG. 3 depicts an exemplary "swim diagram" which depicts various operations performed by system components in accordance with embodiments of the present invention.
Figure 4:
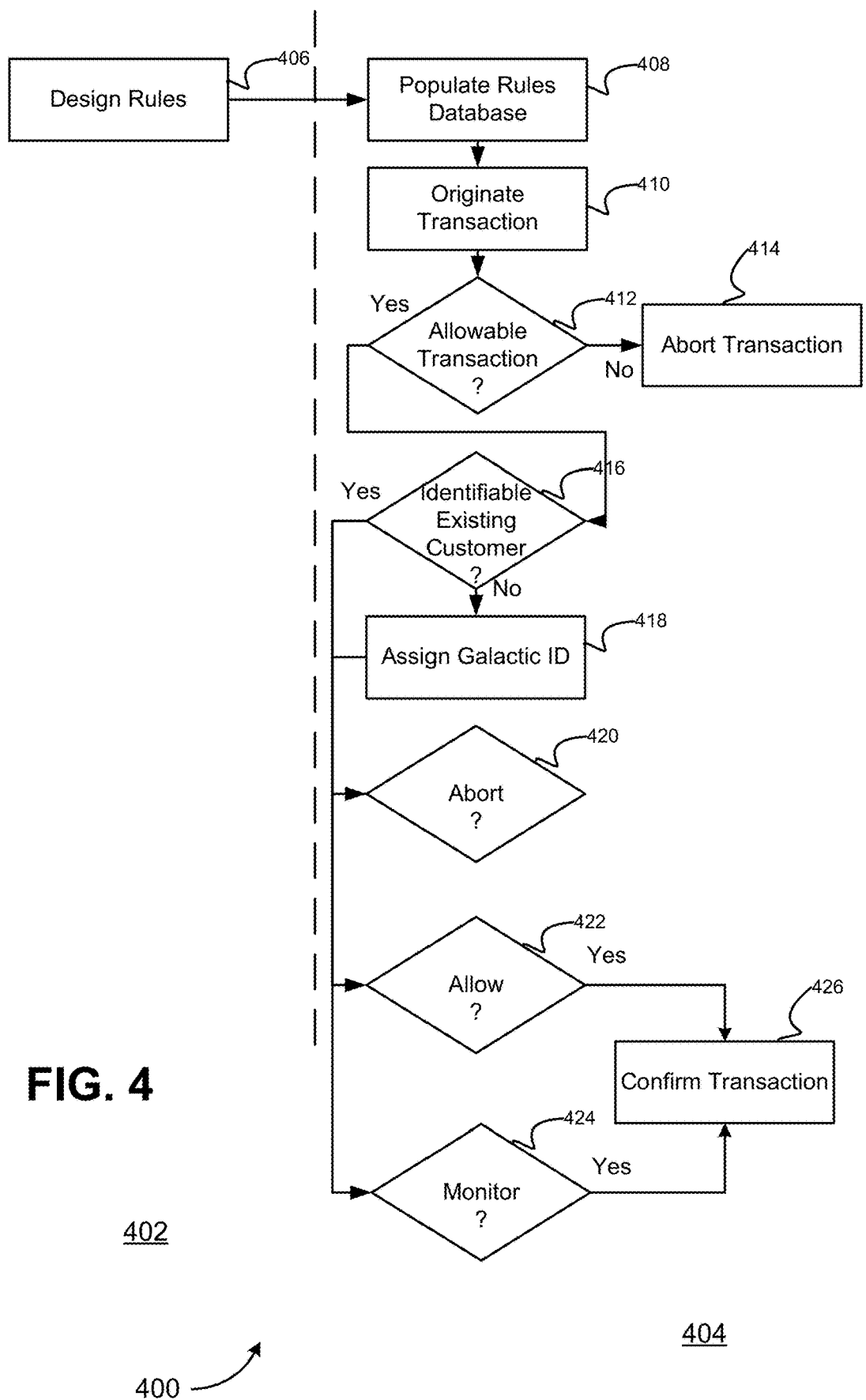
FIG. 4 depicts an alternative "swim diagram" in accordance with embodiments of the present invention.

As mentioned previously, the various steps to complete method embodiments of the present invention may take place at different locations within the exemplary system. FIGS. 3 and 4 demonstrate this. Referring initially to FIG. 3, an exemplary method 300 will be described. FIG. 3 depicts a "swim diagram," which places steps either as taking place at a host computer 302 or an origination location 304. The method 300 begins at block 306 at which rules are designed. The rules are transferred from the host 302 to a point of sale device at an origination location 304. They rules are populated into some sort of storage at block 308. Thereafter, a sender requests to originate a transaction at block 310. A determination is made at block 312, based on initial information, whether the transaction is allowable. If not, the transaction is aborted at the origination at block 314. Otherwise, the transaction details are forwarded to the host computer for an attempt to identify the customer as an existing customer at block 316.

If the host computer is unable to identify the identify the customer as an existing customer, even after interaction with the origination location to collect additional information, then the host assigns a galactic ID to the customer at block 318, and the process continues to steps 320, 322 and 324, as if the host was able to determine the customer to be an existing customer. The host determines whether the transaction is to be aborted (block 320), allowed (block 322), or allowed and monitored (block 324). If the determination is made to allow the transaction, with or without monitoring, the allowability of the transaction is confirmed back to the origination location 304 at block 326.

Referring now to FIG. 4, a swim diagram 400 is explained, also having a host computer 402 set of steps, and an origination location 404 set of steps. In this case, the rules are designed, as before, at block 406 and populated into a rules database at the origination location at block 408. The transaction is originated at block 410, determined whether it is allowable at block 412, and, if not, aborted at block 414, all as before in FIG. 3. Thereafter, however, the attempt to identify the customer (block 416), the assignment of a galactic ID (block 418), and the decisions whether to abort (block 420), allow (block 422), or allow and monitor (block 424) are all made at the origination location 404. Of course, many different variations are possible. If a decision is made either at block 422 to allowed the transaction or at block 424 to monitor the transaction, the transaction is confirmed at block 426.

Figure 5:
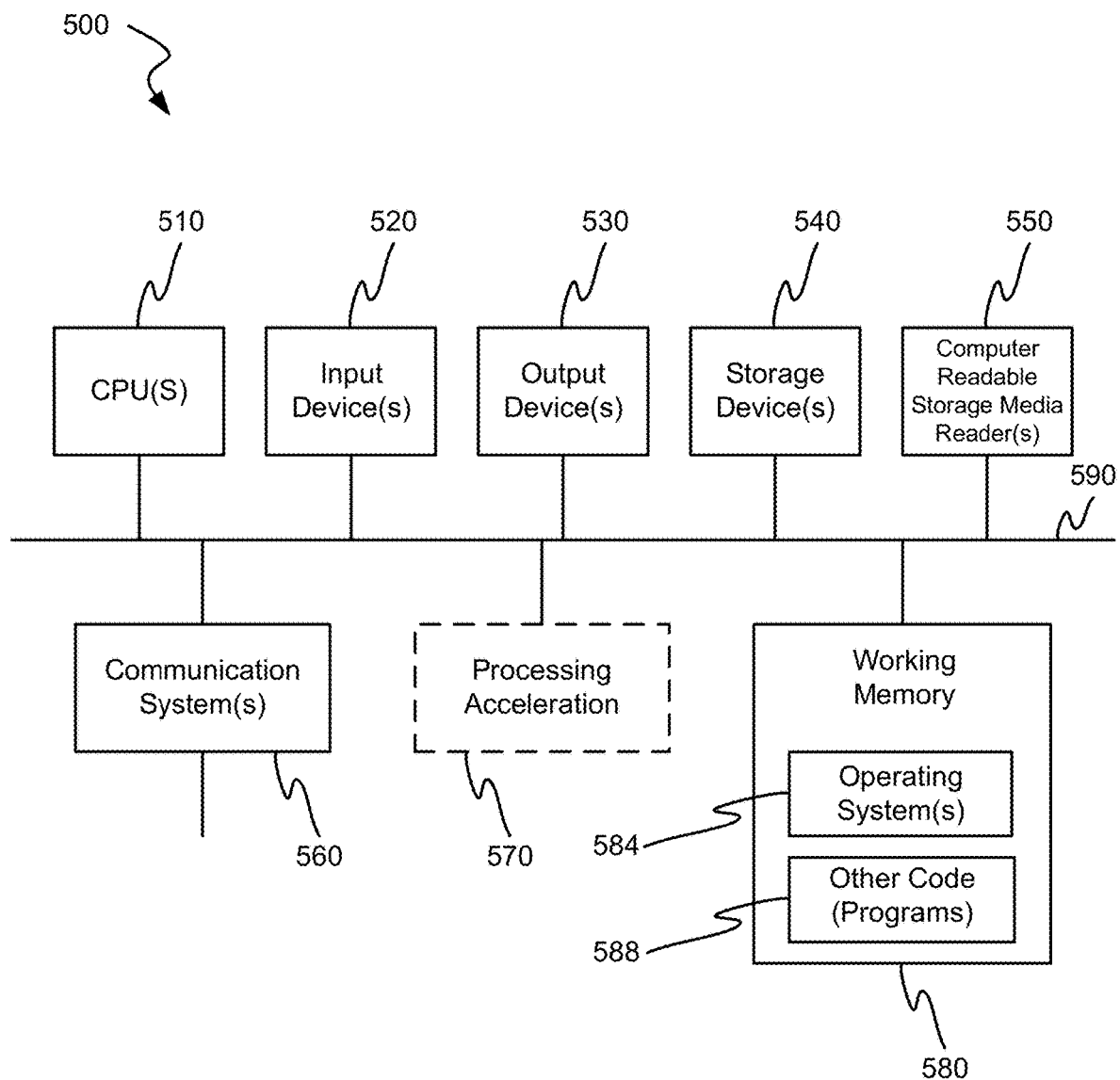
FIG. 5 depicts an exemplary computer architecture for various computing devices in which embodiments of the present invention may be implemented.

Turning now to FIG. 5 is a block diagram illustrating an exemplary computer system upon which embodiments of the present invention may be implemented will be explained. This example illustrates a computer system 500 such as may be used, in whole, in part, or with various modifications, to provide the functions of the sender's mobile device, the host computer system 108, the origination point-of-sale device 103, and/or the money transfer reception location point-of-sale device 105.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of methods of FIGS. 2-4 or methods according to other embodiments.

Figure 6:
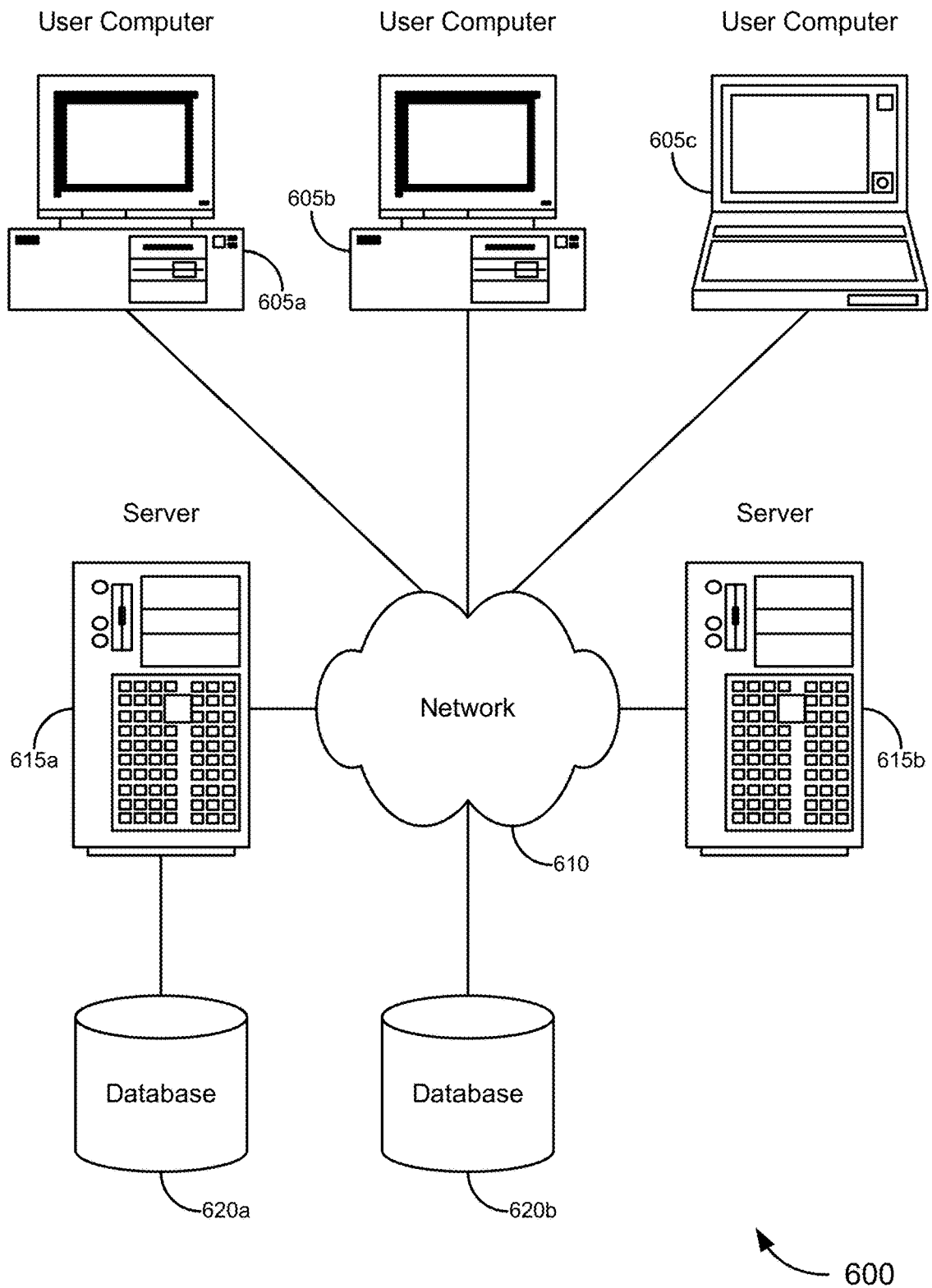
FIG. 6 depicts various computing devices which may be used to implement embodiments of the present invention.

Computers implementing embodiments of the present invention may be arranged in a number of different arrangements. Merely by way of example, FIG. 6 depicts a schematic diagram of a system 600 that can be used in accordance with embodiments of the present invention. The system 600 can include one or more user computers 605a, 605b, and 605c being examples. The user computers 605 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially available UNIX™ or UNIX-like operating systems. These user computers 605 can also have any of a variety of applications, including one or more applications configured to perform methods of the invention, as well as one or more office applications, database client and/or server applications, and/or web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and/or navigating web pages or other types of electronic documents. Although the exemplary system 600 is shown with three user computers 605, any number of user computers can be supported.

Embodiments of the present invention can operate in a networked environment, which can include a network 610. The network 610 can be any type of network familiar to those skilled in the art that can support data communications using any of a variety of commercially available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615a and 615b. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java' servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java™, C, C #™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 605 and/or another server 615. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620*a* and 620*b*. The location of the database(s) 620 is discretionary: merely by way of example, a database 620*a* might reside on a storage medium local to (and/or resident in) a server 615*a* (and/or a user computer 605). Alternatively, a database 620*b* can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle™ database, that is adapted to store, update, and retrieve data in response to SQL-formatted commands. The database might be controlled and/or maintained by a database server, as described above, for example.

In a further embodiment, a transaction system which includes a loyalty host to administer a loyalty program may be provided. In some instances, the loyalty host may be a component of the one or more machines included in the transaction system performing other functions. Alternatively, the loyalty host may be a standalone system receiving transaction details from another component of the transaction system. The loyalty host may be used to automatically enroll customers in a loyalty program.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of performing transfers between senders and recipients using a third-party transfer service, the method comprising:
   receiving, via a point of sale device, transaction details for a requested transfer from a sender;
   associating a unique customer identifier with the sender by:
   using the transaction details for the requested transfer, attempting to identify the sender as an existing customer of a third-party transfer service; and
   in response to identifying the sender as an existing customer of the third-party transfer service, retrieving a unique customer identifier and a transaction history associated with the sender, from the third-party transfer service;
   determining whether the requested transfer is an allowable transaction, wherein determining whether the requested transfer is an allowable transaction is based on whether a transaction pattern comprises suspicious transaction patterns involving: (1) the transaction details of the requested transfer, and (2) the transaction history associated with the sender;
   in response to a determination that the requested transfer is an allowable transaction:
   initiating a transfer record for the requested transfer, the transfer record including the unique customer identifier associated with the sender;
   associating a transfer control number with the transfer record; and
   using the transfer control number to perform a transfer to a recipient via the third-party transfer service.

2. The method of claim 1, wherein the determining whether the requested transfer is an allowable transaction is based on (3) a recipient identifier associated with the requested transfer.

3. The method of claim 1, wherein the determining whether the requested transfer is an allowable transaction is based on (4) a destination identifier associated with the requested transfer, wherein the destination identifier indicates a receiver location of the requested transfer.

4. The method of claim 1, wherein the third-party transfer service stores a unique customer identifier and a transaction history for each existing customer, wherein the unique customer identifiers are not provided to the customers.

5. The method of claim 4, wherein the transaction details received from the sender does not include the unique customer identifier associated with the sender.

6. The method of claim 4, further comprising:
   in response to the determination that the requested transfer is an allowable transaction, determining whether the allowable transaction is to be monitored, based on the transaction details received via a point of sale device.

7. The method claim 6, further comprising:
   in response to the determination that the requested transfer is an allowable transaction, determining whether the allowable transaction is to be monitored, based on whether or not the attempt to identify the sender as an existing customer of a third-party transfer service was successful.

8. The method of claim 7, further comprising:
   in response to the determination that the allowable transaction is to be monitored:
   (a) receiving a request from the recipient at a recipient location, to receive funds associated with the requested transfer; and
   (b) attempting to identify the recipient as an existing customer of a third-party transfer service, based at least on the transaction details for the requested transfer and the recipient location from which the recipient requested to receive the funds.

9. The method of claim 1, further comprising:
   in response to determining that the recipient is an existing customer of the third-party transfer service:

retrieving a transaction history associated with the recipient from the third-party transfer service; and performing a second determination whether the requested transfer is an allowable transaction, based at least on the transaction history.

10. A non-transitory, computer-readable storage medium having stored thereon instructions for causing at least one computer system to perform transfers between senders and recipients using a third-party transfer service at least in part by operations comprising:

receiving, via a point of sale device, transaction details for a requested transfer from a sender;

associating a unique customer identifier with the sender by:

using the transaction details for the requested transfer, attempting to identify the sender as an existing customer of a third-party transfer service; and in response to identifying the sender as an existing customer of the third-party transfer service, retrieving a unique customer identifier and a transaction history associated with the sender, from the third-party transfer service;

determining whether the requested transfer is an allowable transaction, wherein determining whether the requested transfer is an allowable transaction is based on whether a transaction pattern comprises suspicious transaction patterns involving: (1) the transaction details of the requested transfer, and (2) the transaction history associated with the sender;

in response to a determination that the requested transfer is an allowable transaction:

initiating a transfer record for the requested transfer, the transfer record including the unique customer identifier associated with the sender;

associating a transfer control number with the transfer record; and using the transfer control number to perform a transfer to a recipient via the third-party transfer service.

11. The non-transitory, computer-readable storage medium of claim 10, wherein the determining whether the requested transfer is an allowable transaction is based on (3) a recipient identifier associated with the requested transfer.

12. The non-transitory, computer-readable storage medium of claim 10, wherein the determining whether the requested transfer is an allowable transaction is based on (4) a destination identifier associated with the requested transfer, wherein the destination identifier indicates a receiver location of the requested transfer.

13. The non-transitory, computer-readable storage medium of claim 10, wherein the third-party transfer service stores a unique customer identifier and a transaction history for each existing customer, wherein the unique customer identifiers are not provided to the customers.

14. The non-transitory, computer-readable storage medium of claim 13, wherein the transaction details received from the sender does not include the unique customer identifier associated with the sender.

15. The non-transitory, computer-readable storage medium of claim 13, the operations further comprising:

in response to the determination that the requested transfer is an allowable transaction, determining whether the allowable transaction is to be monitored, based on the transaction details received via a point of sale device.

16. The non-transitory, computer-readable storage medium of claim 15, the operations further comprising:

in response to the determination that the requested transfer is an allowable transaction, determining whether the allowable transaction is to be monitored, based on whether or not the attempt to identify the sender as an existing customer of a third-party transfer service was successful.

17. The non-transitory, computer-readable storage medium of claim 16, the operations further comprising:

in response to the determination that the allowable transaction is to be monitored:

(a) receiving a request from the recipient at a recipient location, to receive funds associated with the requested transfer; and (b) attempting to identify the recipient as an existing customer of a third-party transfer service, based at least on the transaction details for the requested transfer and the recipient location from which the recipient requested to receive the funds.

18. The non-transitory, computer-readable storage medium of claim 10, the operations further comprising:

in response to determining that the recipient is an existing customer of the third-party transfer service:

retrieving a transaction history associated with the recipient from the third-party transfer service; and performing a second determination whether the requested transfer is an allowable transaction, based at least on the transaction history.

19. A system comprising:

one or more processors; and a memory coupled with the one or more processors, the memory configured to store instructions that, when executed by the one or more processors, cause the one or more processors to:

receive, via a point of sale device, transaction details for a requested transfer from a sender;

associate a unique customer identifier with the sender by:

using the transaction details for the requested transfer, attempt to identify the sender as an existing customer of a third-party transfer service; and in response to identifying the sender as an existing customer of the third-party transfer service, retrieve a unique customer identifier and a transaction history associated with the sender, from the third-party transfer service;

determine whether the requested transfer is an allowable transaction, wherein determining whether the requested transfer is an allowable transaction is based on whether a transaction pattern comprises suspicious transaction patterns involving: (1) the transaction details of the requested transfer, and (2) the transaction history associated with the sender;

in response to a determination that the requested transfer is an allowable transaction:

initiate a transfer record for the requested transfer, the transfer record including the unique customer identifier associated with the sender;

associate a transfer control number with the transfer record; and use the transfer control number to perform a transfer to a recipient via the third-party transfer service.

20. The system of claim 19, wherein the determining whether the requested transfer is an allowable transaction is based on (3) a recipient identifier associated with the requested transfer.

* * * * *